US012804047B2

(12) United States Patent
Modadugu et al.

(10) Patent No.: US 12,804,047 B2
(45) Date of Patent: Nov. 17, 2026

(54) GENERATING VERIFIED GROUP PROFILES

(71) Applicant: American Express Travel Related Services Company, Inc., New York, NY (US)

(72) Inventors: Rajendra Prasad Modadugu, Sunrise, FL (US); Arun Nehru Sriramoju, Bangalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 231 days.

(21) Appl. No.: 18/669,704

(22) Filed: May 21, 2024

(65) Prior Publication Data

US 2025/0365347 A1 Nov. 27, 2025

(51) Int. Cl.
*H04L 67/306* (2022.01)
*H04L 67/1396* (2022.01)

(52) U.S. Cl.
CPC ........ *H04L 67/306* (2013.01); *H04L 67/1396* (2022.05)

(58) Field of Classification Search
CPC .......................... H04L 67/306; H04L 67/1396
See application file for complete search history.

(56) References Cited

U.S. PATENT DOCUMENTS 11,063,770 B1 * 7/2021 Peng ........................ G06F 21/64
2009/0248653 A1 * 10/2009 Rolls ........................ G06F 16/20
707/999.005
2012/0197754 A1 * 8/2012 Kalin ................. G06Q 30/0619
705/26.8
2017/0076379 A1 * 3/2017 Wadley .................. G06Q 40/06
2019/0349371 A1 * 11/2019 Smith ...................... H04L 9/321
2020/0111118 A1 * 4/2020 Patel .................... G06Q 20/384
2020/0145229 A1 * 5/2020 Li ......................... H04L 9/3247
2020/0242221 A1 * 7/2020 Chen ........................ H04L 63/08
2020/0304560 A1 * 9/2020 Buchner ................. G06F 21/33
2020/0374132 A1 * 11/2020 Lobban .................. G06Q 10/00
2021/0011905 A1 * 1/2021 Uhr ....................... H04L 9/0637
2021/0084039 A1 * 3/2021 Murdoch ............ H04L 63/0823
2023/0028555 A1 * 1/2023 Cameron ............ G06F 21/6245
(Continued)

OTHER PUBLICATIONS

Sporny et al., Verifiable Credentials Data Model 1.0, Nov. 19, 2019, 122 pages (Year: 2019).*
(Continued)

*Primary Examiner* — Hieu T Hoang
(74) *Attorney, Agent, or Firm* — Thomas Horstemeyer, LLP

(57) ABSTRACT

Disclosed are various embodiments for generating a group activity profile. To begin, a computing device can receive a request to establish a relationship between a first user and a second user. The computing device can receive one or more identifiers associated with the first user. Then, the computing device can verify the relationship between the first user and the second user based at least in part on the one or more identifiers. Next, the computing device can receive consent to establish the relationship. Finally, the computing device can generate a relationship profile comprising at least first user data associated with the first user and second user data associated with the second user.

21 Claims, 5 Drawing Sheets

(56) References Cited

U.S. PATENT DOCUMENTS

| | | | | |
|---|---|---|---|---|
| 2023/0132505 | A1* | 5/2023 | Lee | H04L 9/3239<br>713/156 |
| 2023/0259918 | A1* | 8/2023 | Rao | G06Q 20/4014<br>705/67 |
| 2023/0319039 | A1* | 10/2023 | Murdoch | H04L 63/0884<br>726/9 |
| 2025/0053672 | A1* | 2/2025 | Chou | G06F 21/62 |

OTHER PUBLICATIONS

Related Case—Modadugu, et al., U.S. Appl. No. 18/394,671, filed Dec. 22, 2023.

* cited by examiner

GENERATING VERIFIED GROUP PROFILES

BACKGROUND

Institutions and organizations may wish to offer their customers or members the ability to combine memberships at a household, business unit, or other group level for related users. However, current systems do not allow for fluid processes of grouping members after individual profiles or accounts have been established. It can be difficult for organizations to identify accounts which may be linked by a relationship. Additionally, current processes are prone to data corruption and fraud.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for generating a group activity profile by establishing one or more relationships between users, verifying the identities of those users, and pooling and analyzing their respective data. Institutions and organizations may wish to offer their customers or members the ability to combine memberships at a household, business unit, or other group level for users who are related to one another in some form. For example, a financial institution may wish to offer its account holders the ability to group accounts at a household level, having one place to view and analyze household level spend patterns. This could allow customers and institutions alike to create more efficient financial plans as well as allow institutions to provide better personalized offers to members of a household.

However, current systems do not allow for fluid processes of grouping members after individual profiles or accounts have been established. It can be difficult for organizations to identify accounts which may be linked by some relationship. It can be even more difficult to verify that such a relationship exists between members without manual entry and confirmation of data by each of the existing members. Moreover, current processes are prone to data corruption and fraud. Accordingly, various embodiments of the present disclosure provide for identity verification, relationship validation, and the subsequent generation of a group profile which combines the data of each individual in the group. In some embodiments, the use of a secure blockchain allows for relationship data to be easily accessible and verifiable without direct user entry and confirmation. This secure mechanism also greatly reduces the risk of fraud and corruption. Similarly, use of techniques such as optical character recognition (OCR) and other document processing techniques can both increase efficiency and reduce risk of fraud and data corruption.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
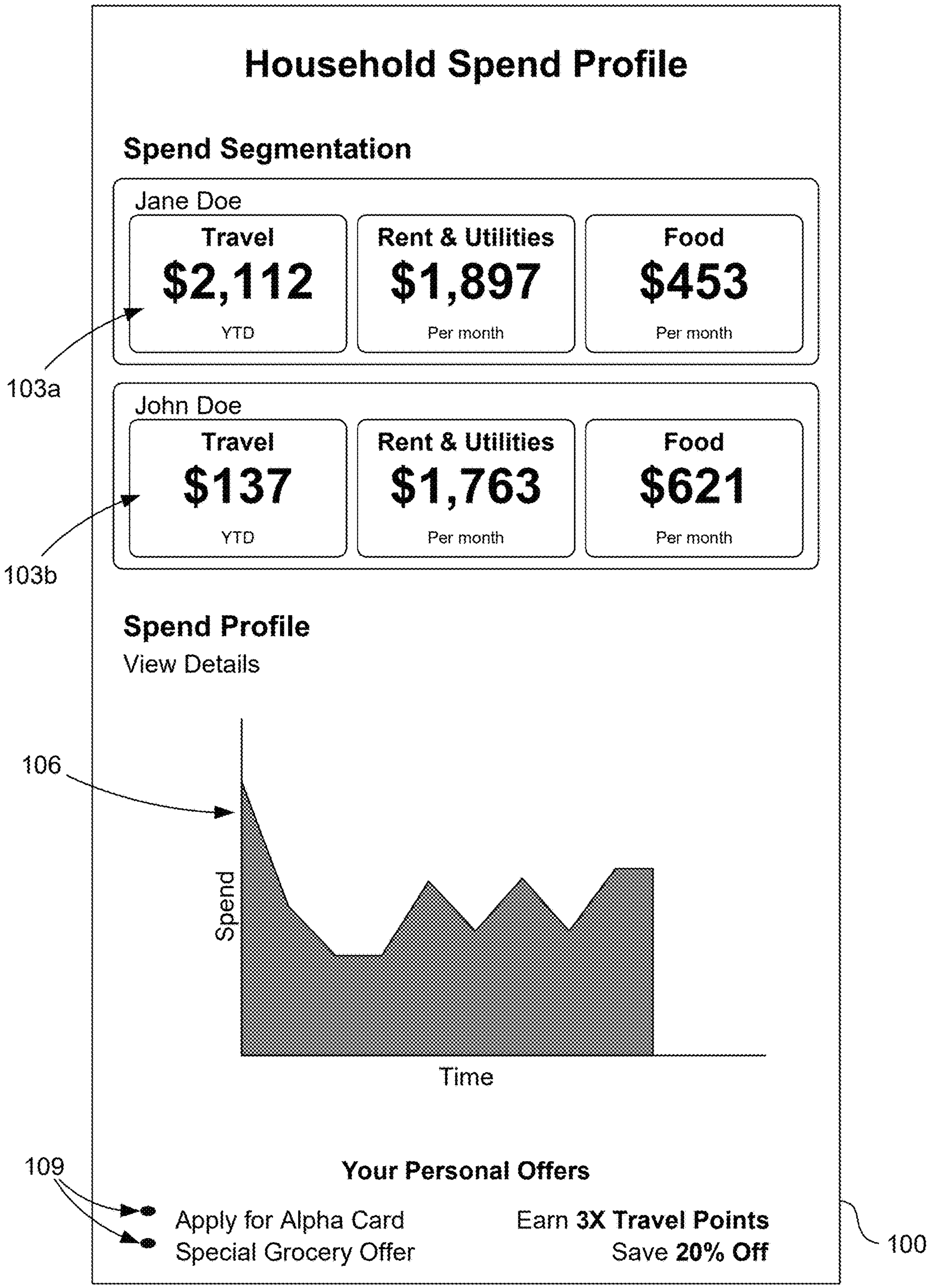
FIG. 1 is a pictorial diagram of an example user interface rendered by a client in the network environment of FIG. 2 according to various embodiments of the present disclosure.

FIG. 1 depicts an example of a user interface 100 presenting a user with a visual representation of their group profile. The user interface 100 can show various information associated with a group profile. For example, as shown in the illustrative example of FIG. 1, the user interface 100 can include a visual representation of segmentation reports 103*a*, 103*b* for each of the members in a group. Each segmentation report 103*a* and 103*b* can be generated based at least in part on the various activity data associated with the user account of the respective group member. In the example of FIG. 1, each segmentation report 103*a* and 103*b* includes a plurality of spend segments representing the various areas or categories in which the users have concentrated spending. However, segmentation reports 103*a* and 103*b* can also include segments directed to various other features identified in the activity data associated with a user.

Additionally, the user interface 100 can include a trend report 106. The trend report 106 can provide both historical and predictive data based at least in part on the activity data associated with the group. As shown in the example of FIG. 1, the trend report 106 is a spend profile depicted as a line graph showing spend over time. However, various other data can be presented in the trend report 106 both in graphical representations as well as textual. For example, in some cases, a trend report 106 can show predicted activities in a pie chart divided according to the percentage of total activity.

Further, the user interface 100 can include one or more suggestions 109 for the group based at least in part on the group profile. In FIG. 1, the suggestions 109 are depicted as recommended offers or opportunities for the group to save or earn points in segments that were identified in the segmentation report 103. The suggestions 109 are determined based at least in part on the various aspects of the group profile and can provide members of the group with personalized opportunities to enhance their experience.

Figure 2:
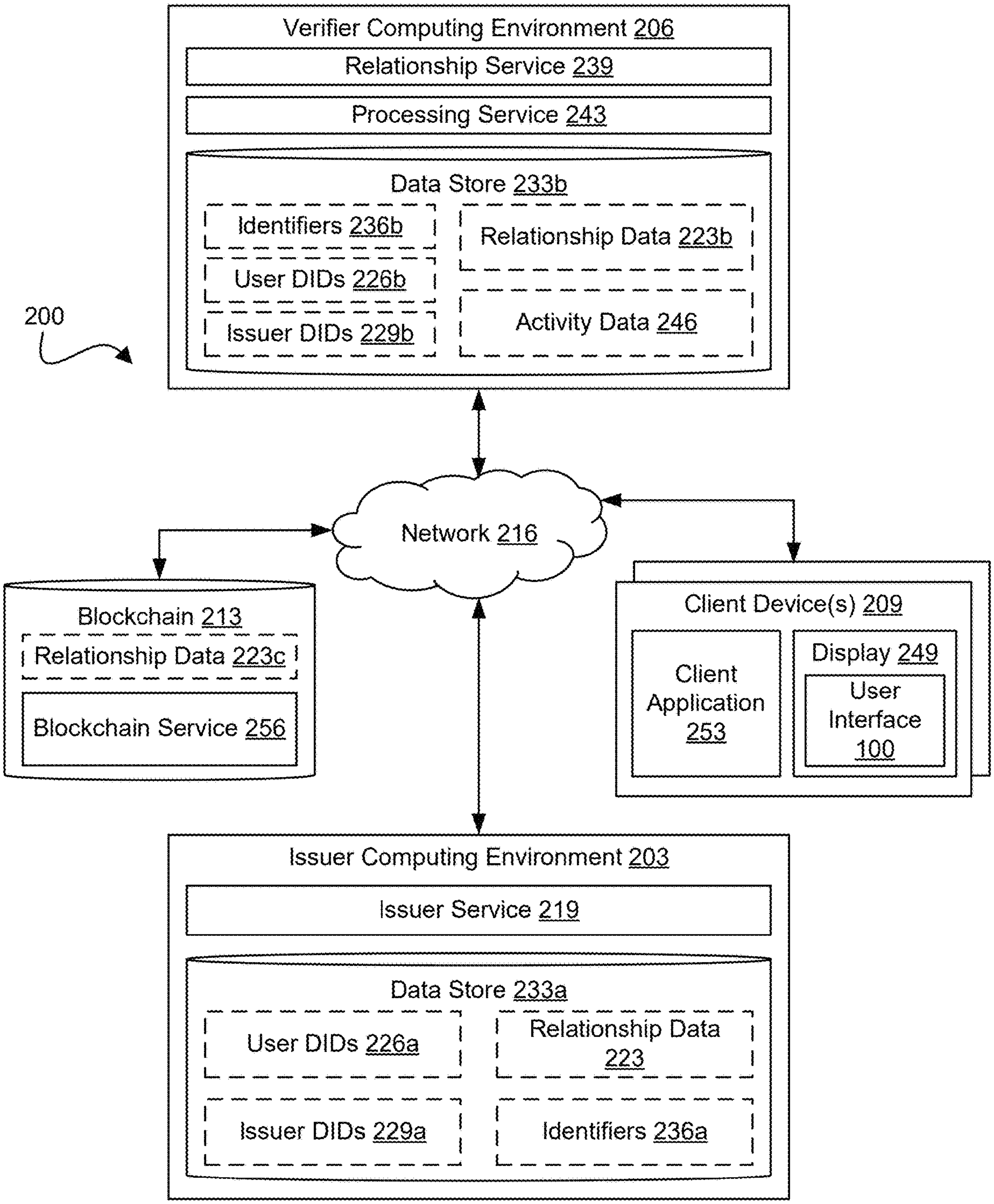
FIG. 2 is a drawing of a network environment according to various embodiments of the present disclosure.

With reference to FIG. 2, shown is a network environment 200 according to various embodiments. The network environment 200 can include an issuer computing environment 203, a verifier computing environment 206, one or more client devices 209, and a blockchain 213, each of which can be in data communication with each other via a network 216.

The network 216 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 216 can also include a combination of two or more networks 216. Examples of networks 216 can include the Internet, intranets, extranets, virtual private networks (VPNs), and similar networks.

The issuer computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 203 can employ a plurality of computing devices that can be arranged in one or more server banks or computer banks or other arrangements. Such computing devices can be located in a single installation or can be distributed among many different geographical locations. For example, the issuer computing environment 203 can include a plurality of computing devices that together can include a hosted computing resource, a grid computing resource, or any other distributed computing arrangement. In some cases, the issuer computing environment 203 can correspond to an elastic computing resource where the allotted capacity of processing, network, storage, or other computing-related resources can vary over time.

Various applications or other functionality can be executed in the issuer computing environment 203. The components executed on the issuer computing environment 203 include an issuer service 219, and other applications, services, processes, systems, engines, or functionality not discussed in detail herein.

The issuer service 219 can be executed to perform various actions. For instance, the issuer service 219 can be executed to obtain relationship data 223. The issuer service 219 can be executed to generate one or more DIDs to identify different aspects of the relationship data 223. For example, the issuer service 219 can generate a user DID 226 to represent a user associated with the relationship data 223. In addition, the issuer service 219 can generate an issuer DID 229 to represent the issuing authority (e.g., the issuer). The issuer service 219 can then be executed to write the relationship data 223 to the blockchain 213. Additional description of actions that can be executed by the issuer service 219 will be further described in the discussion of FIG. 3.

Also, various data is stored in a data store 233*a* that is accessible to the issuer computing environment 203. The data store 233*a* can be representative of a plurality of data stores 233*a*, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 233*a* is associated with the operation of the various applications or functional entities described below. This data can include relationship data 223*a*, user DIDs 226*a*, issuer DIDs 229*a*, identifiers 236*a*, and potentially other data.

The relationship data 223*a* can represent information about one or more users submitted to the issuer (also referred to herein as the "issuing authority"). For example, the relationship data 223*a* can represent personal information associated with a user which can be used to determine relationships to other users. For example, relationship data 223*a* can include personal information such as a name, address, social security number (SSN), contact information, or other personal information which can be used to indirectly deduce relationships to other users. Additionally, the relationship data 223*a* can include direct information about the user's relationships to other users. For example, the relationship data 223*a* can include organizational associations of the user, familial relations to the user, contact lists associated with the user, and other suitable relationship data 223*a*. The relationship data 223*a* can also include various other forms of data described herein, such as user DIDs 226, identifiers 236, etc. The relationship data 223*a* can also be used to identify a person or entity associated with a user DID 226.

The user DIDs 226*a* can represent an identifier that enables verifiable, decentralized digital identity of a user. In some examples, the user DID 226*a* can be used to represent the identity of a user, a client device 209 associated with the user, and other suitable subjects. In various examples, a user DID 226*a* can include an address to a user DID document on a distributed ledger that includes information associated with the subject (e.g., a user, a client device 209, etc.). According to various embodiments, user DID documents can be hosted on any computing environment, such as the issuer computing environment 203, the verifier computing environment 206, the client device 209, or any other computing environment. In such a situation, the user DID document can be shared peer-to-peer. In various examples, the user DID 226*a* can be implemented using various standards, such as a version of the World Wide Web Consortium's (W3C's) Decentralized Identifier (DID) standard. In at least some embodiments, the user DIDs 226*a* can be implemented as a peer DID. Peer decentralized identifiers (peer DIDs) are an extension of the traditional DID concept, such that it allows for the creation of DIDs without the need for an external blockchain or distributed ledger. Instead, peer DIDs are established and maintained directly between two or more parties, or peers, using a peer-to-peer (P2P) network. This approach eliminates the need for relying on a central registry or global consensus mechanism. Peer DIDs can be implemented using various standards, such as a version of the World Wide Web Consortium's (W3C's) peer DID method specification.

The issuer DIDs 229*a* can represent an identifier that enables verifiable, decentralized digital identity of a subject (e.g., an entity, organization, institution, thing, etc.). In some examples, the issuer DID 229*a* can be used to represent the identity of an issuing authority, an issuer computing environment 203, and other suitable subjects. In various examples, an issuer DID 229*a* can include an address to an issuer DID document on a distributed ledger that includes information associated with the subject (e.g., an issuing authority, an issuer computing environment 203, etc.). According to various embodiments, issuer DID documents can be hosted on any computing environment, such as the issuer computing environment 203, the verifier computing environment 206, the client device 209, or any other computing environment. In such a situation, the issuer DID document can be shared peer-to-peer. In various examples, the issuer DID 229*a* can be implemented using various standards, such as a version of the World Wide Web Consortium's (W3C's) Decentralized Identifier (DID) standard. In at least some embodiments, the issuer DIDs 229*a* can be implemented as a peer DID. Peer DIDs can be implemented using various standards, such as a version of the World Wide Web Consortium's (W3C's) peer DID method specification. In such an embodiment, the one or more computing environments (e.g., issuer computing environment 203, verifier computing environment 206, etc.) can identify each other and share their respective issuer DIDs 229*a*, as well as any other information, without having to involve a centralized repository, such as a distributed ledger.

The DID documents can include information associated with a subject (e.g., user, transaction, device, etc.). For example, the DID document can include a set of data describing the subject and can include various information (e.g., cryptographic keys) that can be used to identify and authenticate the subject. In at least one example, the DID document can include various public keys, such as an issuer public key or an account public key. In various examples, the DID document can be implemented using various standards, such as the World Wide Web Consortium's (W3C's) Decentralized Identifier (DID) standard.

The identifiers 236*a* can be representative of a DID or an identification document which can be used to verify a relationship between a first user and a second user, a first user and an issuing authority, a first user and an organization, or another relationship. In some examples, the identifiers 236*a* can represent a link or code which identifies a relationship. In some embodiments, the identifier 136*a* can be an address (e.g., a web address/link, etc.), a matrix barcode (e.g., a Quick Response (QR) code), a barcode, or other form of link or code which can be used to identify a relationship. In some embodiments, an identifier 236*a* can represent an identification document (e.g., passport, driver's license, birth certificate, employee identification badge, membership card, etc.) which can be used to identify a relationship.

The verifier computing environment 206 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 206 can employ a plurality of computing devices that can be arranged in one or more server banks or computer banks or other arrangements. Such computing devices can be located in a single installation or can be distributed among many different geographical locations. For example, the verifier computing environment 206 can include a plurality of computing devices that together can include a hosted computing resource, a grid computing resource, or any other distributed computing arrangement. In some cases, the verifier computing environment 206 can correspond to an elastic computing resource where the allotted capacity of processing, network, storage, or other computing-related resources can vary over time.

Various applications or other functionality can be executed in the verifier computing environment 206. The components executed on the verifier computing environment 206 include a relationship service 239, a processing service 243, and other applications, services, processes, systems, engines, or functionality not discussed in detail herein.

The relationship service 239 can be representative of a service which can be configured to establish a relationship between at least a first user and at least a second user. The relationship service 239 can facilitate communications and data flow between the various applications and services in the network environment 200 to establish a relationship between the first user and at least a second user. The relationship service 239 can be executed to perform various actions. For instance, the relationship service 239 can be executed to receive a request to establish a relationship from a first user, request the necessary information to verify the identity of the first user, and identify potential relationships with users who may have connections to the first user. Then, the relationship service 239 can be configured to receive a selection of one of the potential relationships identified, identify a second user corresponding to the selection, and send the second user a consent request to establish the relationship. Once the relationship service 239 has received a positive consent response from the second user, the relationship status can verify the identity of the second user and establish the relationship. The relationship service 239 can generate a relationship profile, combining activity data 246 of both the first user and the second user, and generate various reports based at least in part on the relationship profile. Additional description of actions that can be executed by the relationship service 239 will be further described in the discussion of FIGS. 3, 4, and 5.

The processing service 243 can be representative of any data evaluation tool used to process the identification documents, or identifiers 236. The processing service 243 can be executed to perform various functions. The processing service 243 can be configured to receive identifiers 236 (e.g., identification documents) and extract data from the identifiers 236. For example, the processing service 243 can receive a passport document, determine that the document is a passport, and extract the name, address, and other data from the passport document. Additional description of actions that can be executed by the processing service 243 will be further described in the discussion of FIG. 4.

Also, various data is stored in a data store 233*b* that is accessible to the verifier computing environment 206. The data store 233*b* can be representative of a plurality of data stores 233*b*, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 233*b* is associated with the operation of the various applications or functional entities described below. This data can include user DIDs 226*b*, issuer DIDs 229*b*, identifiers 236*b*, relationship data 223*b*, activity data 246, and potentially other data. User DIDs 226*b* can be otherwise identical to the user DIDs 226*a*, except stored in data store 233*b* rather than data store 233*a*. Issuer DIDs 229*b* can be otherwise identical to the issuer DIDs 229*a*, except stored in data store 233*b* rather than data store 233*a*. Identifiers 236*b* can be otherwise identical to identifiers 236*a*, except stored in data store 233*b* rather than data store 233*a*. Relationship data 223*b* can be otherwise identical to the relationship data 223*a*, except stored in data store 233*b* rather than data store 233*a*.

The activity data 246 can be representative of transaction history, rewards points engagement, account records, or other records of activities and behaviors associated with a particular user. In some embodiments, activity data 246 can include or otherwise be associated with an identifier 236. Activity data 246 can include or otherwise be associated with a user DID 226, an issuer DID 229, or both. In some embodiments, the activity data 246 can include activity data 246 associated with a first user as well as activity data 246 associated with the second user, etc.

The client device 209 is representative of a plurality of client devices that can be coupled to the network 216. The client device 209 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 209 can include one or more displays 249 such as liquid crystal displays (LCDs), gas plasma-based flat panel displays, organic light emitting diode (OLED) displays, electrophoretic ink ("E-ink") displays, projectors, or other types of display devices. In some instances, the display 249 can be a component of the client device 209 or can be connected to the client device 209 through a wired or wireless connection.

The client device 209 can be configured to execute various applications such as a client application 253 or other applications. The client application 253 can be executed in a client device 209 to access network content served up by the issuer computing environment 203, the verifier computing environment 206, or other servers, thereby rendering a user interface 100 on the display 249. To this end, the client application 253 can include a browser, a dedicated application, or other executable, and the user interface 100 can include a network page, an application screen, or other user mechanism for obtaining user input. The client device 209 can be configured to execute applications beyond the client application 253 such as email applications, social networking applications, word processors, spreadsheets, or other applications. Additional description of actions that can be executed by the client application 253 will be further described in the discussion of FIGS. 3 and 4.

The blockchain 213 can represent an immutable, append only, eventually consistent distributed data store formed from a plurality of nodes in a peer-to-peer network that maintain duplicate copies of data stored in the blockchain 213. The nodes of the blockchain 213 can use a variety of consensus protocols to coordinate the writing of data written to the blockchain 213. In order to store or retrieve data to/from the blockchain 213, a blockchain service 256 can be used.

Individual nodes of the blockchain 213 can host a blockchain service 256. The blockchain service 256 can be configured to receive requests from other computing devices (e.g., from the issuer computing environment 203, the verifier computing environment 206, various client devices 209, etc.) and respond to the requests. For example, the blockchain service 256 could receive a request from a computing device to write data to the blockchain 213. In response, the blockchain service 256 could write the data to the blockchain 213 and verify that other nodes of the blockchain 213 also wrote the data to the blockchain 213. As another example, the blockchain service 256 could receive a request from a computing device to read data from the blockchain 213. In response, the blockchain service 256 could search the blockchain 213 and return the requested information from the blockchain 213. Other operations could also be performed by the blockchain service 256 in various embodiments of the present disclosure.

Blockchains may be public or private. A public blockchain is a blockchain 213 that is accessible and available to anyone who operates a node, client, or other application configured to connect to or participate in the public blockchain. A private blockchain, sometimes referred to as a permissioned blockchain, is a blockchain 213 where participation is limited to authorized or permitted participants. A private blockchain can be used in situations where the advantages of an immutable, append only, eventually consistent distributed data stores formed from a plurality of nodes in a peer-to-peer network that maintain duplicate copies of data is desired, but public or unrestricted access to the data is not desired. Examples of public blockchains include the BITCOIN network, the ETHEREUM network, the SOLANA network, etc. Examples of private blockchains include sidechains to the BITCOIN network or ETHEREUM network, as well as HYPERLEDGER or similar systems. In some embodiments, the blockchain 213 is a private blockchain accessible only to the issuer and the verifier.

Next, a general description of the operation of the various components of the network environment 200 is provided. To begin, a user may interact with an issuer, where an issuer service 219 can obtain relationship data 223 associated with the user. The issuer service 219 can generate one or more DIDs associated with the relationship data 223, such as, for example, one or more user DIDs 226 and an issuer DID 229. Next, the issuer service 219 can send an instruction to a blockchain service 256 to write the relationship data 223 and generated DIDs to the blockchain 213.

Then, a first user can initiate the generation of a group profile by sending a request to establish a relationship. In some examples, the request to establish a relationship is received by a relationship service 239. In response to receiving the request, the relationship service 239 can request an identifier 236. The first user, or a client application 253*a* associated with the first user, can provide the identifier 236 for the relationship service 239 to process. The relationship service 239 can obtain and validate relationship data 223 based at least in part on the identifier 236. Once the relationship data 223 has been validated, the relationship service 239 can identify a second user associated with the relationship data 223 and obtain consent from the second user. After obtaining consent, the relationship service can establish the relationship between the first user and the second user.

Once the relationship has been established, the relationship service 239 can continue to generate the relationship profile by determining activity data 246 associated with each of the users associated with the relationship and generating a relationship profile based at least in part on the activity data 246. The relationship service 239 can generate trend reports, segmentation reports, or perform other data analysis for presentation to the users.

Figure 3:
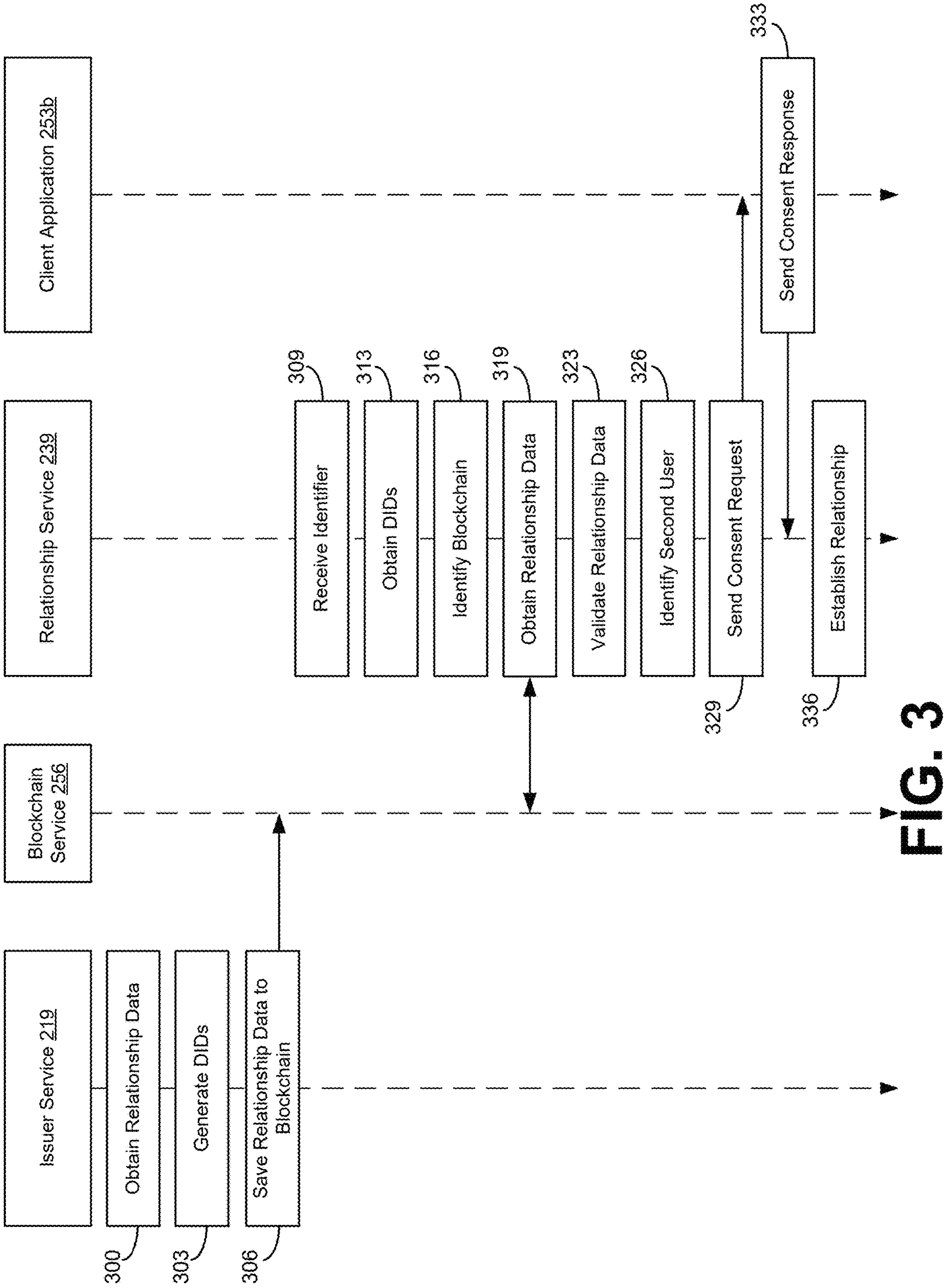
FIG. 3 is a sequence diagram illustrating interactions between various components of the network environment of FIG. 2 according to various embodiments of the present disclosure.

Referring next to FIG. 3, shown is a sequence diagram that provides one example of the interactions between the issuer service 219, the blockchain service 256, the relationship service 239, and a client application 253. The sequence diagram of FIG. 3 provides merely an example of the many different types of functional arrangements that can be employed to implement the operations of the depicted portions of the issuer service 219, the blockchain service 256, the relationship service 239, and a client application 253. As an alternative, the sequence diagram of FIG. 3 can be viewed as depicting an example of elements of a method implemented within the network environment 200.

Beginning with block 300, the issuer service 219 can be executed to obtain relationship data 223. Relationship data 223 can be obtained from a data store 233, received from a client application 253 of a client device 209, or from another system, service, or application in the network environment 200. The relationship data 223 can be obtained in association with an interaction between a first user and an issuing authority.

Next, at block 303, the issuer service 219 can be executed to generate one or more DIDs. For example, the issuer service 219 can issue a user DID 226 corresponding to the first user, a user DID 226 corresponding to a second user, and an issuer DID 229 corresponding to the issuing authority. The user DID 226 and the issuer DID 229 can be generated separately and independently or concurrently depending on various factors.

To generate a user DID 226, the issuer service 219 can first generate a user DID document that includes various relationship data 223 obtained at block 300, as well as other information, such as the identity of the client device 209 associated with the first user, or information relating to another suitable subject. The user DID document can also include a user public key that is publicly accessible and associated with the first user. The user DID document can be stored in the issuer computing environment 203, or other computing environment. Once the user DID document has been generated, the user DID 226 can be generated to reference the user DID document according to at least one of the World Wide Web Consortium's (W3C's) Decentralized Identifier (DID) standard or the Identity Foundation's peer DID standard.

Similarly, to generate an issuer DID 229, the issuer service 219 can first generate an issuer DID document that includes various data associated with the issuer, such as the identity or address of the issuer computing environment 203, or information relating to another suitable subject. The issuer DID document can also include a user public key that is publicly accessible and associated with the partner/issuer institution. The issuer DID document can be stored in the issuer computing environment 203, or another computing environment. Once the issuer DID document has been generated, the issuer DID 229 can be generated to reference the issuer DID document according to at least one of the World Wide Web Consortium's (W3C's) Decentralized Identifier (DID) standard or the Identity Foundation's peer DID standard. In some embodiments, the issuer service 219 can generate the issuer DID 229 specific to the transaction between the first user and the issuer. In some embodiments, the issuer service 219 can use a pre-existing issuer DID 229 to associate with the relationship data 223 instead of generating a new issuer DID 229. In various examples, the issuer service 219 can implement the user DID 226 and the issuer DID 229 as peer DIDs using various standards, such as a version of the World Wide Web Consortium's (W3C's) peer DID method specification.

At block 306, the issuer service 219 can be executed to save the relationship data 223 to the blockchain 213. In some embodiments, the issuer service 219 sends a write request to the blockchain service 256 to have the relationship data 223 written to the blockchain 213. According to various examples, the issuer service 219 saves the relationship data 223 to the blockchain 213 in the form of a DID. The issuer service 219 can encrypt the relationship data 223 before saving the relationship data 223 to the blockchain 213.

At block 309, the relationship service 239 can be executed to receive an identifier 236. In some embodiments, the relationship service 239 receives an identifier 236 from a client application 253*a* associated with the first user. In some embodiments, the relationship service 239 can receive or obtain the identifier 236 from another system, service, or application in the network environment 200. The identifier 236 can be received by the relationship service 239 in the form of a link or an address to computing environment or a data store 233 where various information associated with the identifier 236 is stored.

Next, at block 313, the relationship service 239 can obtain the user DID 226 and the issuer DID 229. The relationship service 239 can obtain the user DID 226 and the issuer DID 229 based at least in part on the identifier 236 received at block 309. In some embodiments, the identifier 236 references data stored on a server in the network environment 200 where the user DID 226 and the issuer DID 229 can be obtained.

At block 316, the relationship service 239 can be executed to identify the blockchain 213. In some embodiments, the relationship service 239 can use the issuer DID 229 obtained at block 313 to determine a peer issuer DID associated with the issuer DID 229. The peer issuer DID can represent a peer DID which is privately shared between the issuer and the verifier. The relationship service 239 can determine the peer issuer DID from data associated with the public issuer DID 229 obtained at block 313. In such embodiments, once the peer issuer DID has been identified, the relationship service 239 can identify the blockchain 213 associated with the peer issuer DID. In some embodiments, the relationship service 239 can select the blockchain 213 based at least in part on the peer issuer DID. In some embodiments, the relationship service 239 can select the blockchain 213 associated with the peer issuer DID from a list of one or more blockchains associated with a variety of different issuer institutions.

At block 319, the relationship service 239 can be executed to obtain the relationship data 223 from the blockchain 213. In some embodiments, the relationship service 239 can determine the relationship data 223 by sending a read request to the blockchain service 256 for the relationship data 223 associated with the user DID 226 obtained at block 313. The relationship service 239 can receive the relationship data 223 from the blockchain service 256 in response to sending the read request.

Then, at block 323, the relationship service 239 can be executed to validate the relationship data 223. The relationship service 239 can validate the relationship data 223 by comparing the relationship data 223 obtained at block 319 to a number of data points stored in a verifier data store 233*b*. In some embodiments, the relationship service 239 can validate the relationship data 223 by evaluating the integrity of the blockchain 213.

Next, at block 326, the relationship service 239 can identify a second user. In some examples, the relationship service 239 identifies a second user associated with the relationship data 223 based at least in part on the relationship data obtained at block 319. For example, the relationship service 239 can obtain a second user DID 226 based at least in part on the relationship data 223. In some examples, the relationship service 239 can identify the second user based at least in part on the user DID 226 obtained at block 313.

At block 329, the relationship service 239 can send a consent request to a client application 253. The consent request can be representative of a message requesting the second user to consent to the establishment of a relationship with the first user. In some examples, the relationship service 239 sends the consent request to a client application 253*b* associated with the second user identified at block 326. In some embodiments, the relationship service 239 can send the consent request to another system, service, or application in the network environment 200.

Next, at block 333, the client application 253*b* can send a consent response. The consent response can be representative of a message either approving or rejecting the establishment of a relationship with the first user. In some embodiments, the client application 253*b* sends the consent response based at least in part on a user input from the second user. In some embodiments, the client application 253*b* sends the consent response to the relationship service 239 in response to receiving the consent request from block 329. In some embodiments, the client application 253*b* can send the consent response to another system, service, or application in the network environment 200.

At block 336, the relationship service 239 can be executed to establish a relationship. In some examples, the relationship service 239 can establish a relationship between the first user and at least the second user based at least in part on receiving a positive consent response from the client application 253*b* at block 333. In some embodiments, the relationship service 239 can save the established relationship to a data store 233. After block 336, the sequence diagram of FIG. 3 comes to an end.

Figure 4:
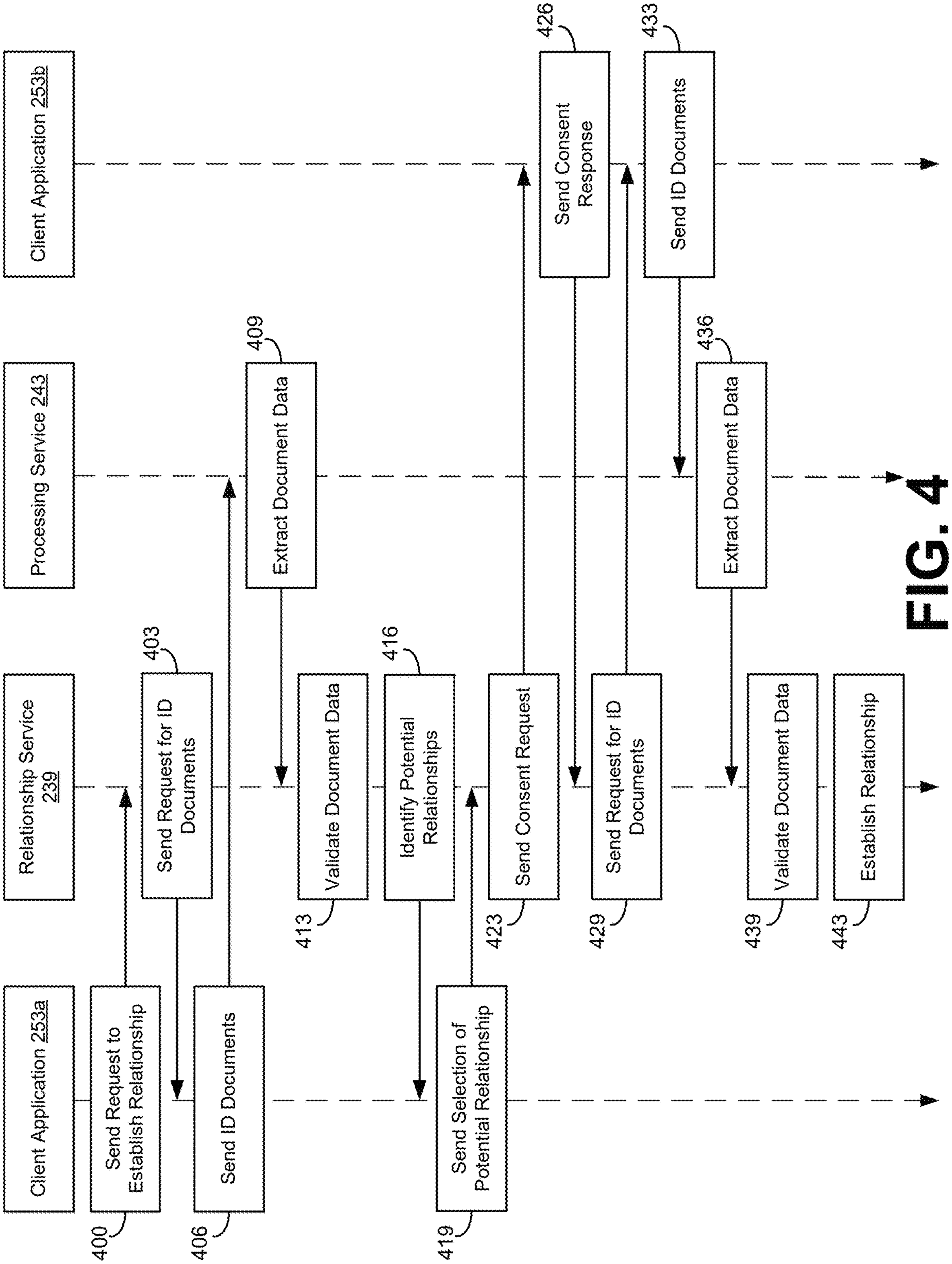
FIG. 4 is a sequence diagram illustrating interactions between various components of the network environment of FIG. 2 according to various embodiments of the present disclosure.

Turning now to FIG. 4, shown is a sequence diagram that provides one example of the interactions between a client application 253*a* associated with a first user, the relationship service 239, the processing service 243, and a client application 253*b* associated with a second user. The sequence diagram of FIG. 4 provides merely an example of the many different types of functional arrangements that can be employed to implement the operations of the depicted portions of the client application 253*a*, the relationship service 239, the processing service 243, and the client application 253*b*. As an alternative, the sequence diagram of FIG. 4 can be viewed as depicting an example of elements of a method implemented within the network environment 200.

Beginning with block 400, the client application 253*a* can be executed to send a request to establish a relationship. The request to establish a relationship can be representative of requests to generate a new group, requests to add particular users to an existing group, or other requests to establish a relationship with one or more other user(s). In some embodiments, the client application 253*a* can send the request to establish a relationship based at least in part on a user input. In some examples, the client application 253*a* can be executed to send the request to the relationship service 239, or another system, service, or application in the network environment 200.

Next, at block 403, the relationship service 239 can be executed to send a request for an identification document. The request for identification documents can be representative of a message requesting the upload or submission of identification documents which can be used to verify the identity of the first user. The relationship service 239 can send a request for identification documents in response to receiving the request to establish a relationship at block 400. In some embodiments, the relationship service 239 sends the request for identification documents to the client application 253*a* associated with the first user, or to another system, service, or application within the network environment 200.

At block 406, the client application 253*a* can be executed to send an identification document. The client application 253*a* can send an identification document in response to receiving the request for identification documents from the relationship service 239 at block 403. The client application 253*a* can send the identification document based at least in part on a user interaction, such as, for example, receiving an uploaded identification document in response to a user interaction. In some examples, the client application 253*a* can send an identification document to the processing service 243, to the relationship service 239, or to another system, service, or application in the network environment 200.

At block 409, the processing service 243 can be executed to extract document data. The processing service 243 can be executed to receive the identification document from the client application 253*a* at block 406, and extract document data from the identification document. The document data can be representative of a document type, a document format, textual data from within the document, and other forms of document data. In some embodiments, the document data can include relationship data 223. The processing service 243 can extract the document data using OCR, artificial intelligence techniques such as, for example, machine learning (ML), natural language processing (NLP), intelligent document processing (IDP), or other data extraction techniques. In some embodiments, the processing service 243 can extract document data based at least in part on receiving the identification document from the client application 253*a* at block 406. The processing service 243 can send the extracted document data to the relationship service 239, or to another system, service, or application within the network environment 200.

Next, at block 413, the relationship service 239 can be executed to validate document data. In some embodiments, the relationship service 239 can validate the document data received from the processing service 243 at block 409. The relationship service 239 can validate the document data based at least in part on a comparison of the document data with data associated with the first user. In some examples, the relationship service 239 can validate the document data based at least in part on one or more DIDs included in the document data, described in greater detail in the discussion of FIG. 3.

Then, at block 416, the relationship service 239 can be executed to identify one or more potential relationships. In some examples, the relationship service 239 can identify one or more potential relationships based at least in part on the document data validated at block 413. For example, the relationship service 239 can identify one or more second users based at least in part on the document data, each of the one or more second users having a connection to the first user identified in the document data. In some embodiments, the relationship service 239 identifies one or more potential relationships based at least in part on the request to establish a relationship received at block 400. The relationship service 239 can send the one or more potential relationships to the client application 253*a* or to another system, service, or application in the network environment 200.

At block 419, the client application 253*a* can be executed to send a selection of one or more potential relationships. In some examples, the client application 253*a* can send a selection of one or more potential relationships based at least in part on a user input. The client application 253*a* can send the selection in response to receiving the potential relationships from the relationship service 239 at block 416. The client application 253*a* can send the selection to the relationship service 239 or to another system, service, or application in the network environment 200.

At block 423, the relationship service 239 can be executed to send a consent request. As described in the discussion of block 329 of FIG. 3, the consent request can be representative of a message requesting the second user to consent to the establishment of a relationship with the first user. In some examples, the relationship service 239 sends the consent request to a client application 253*b* associated with a second user identified based at least in part on the selection of potential relationships sent at block 419. In some embodiments, the relationship service 239 can send the consent request to another system, service, or application in the network environment 200.

At block 426, the client application 253*b* can be executed to send a consent response. As described in the discussion of block 333 of FIG. 3, the consent response can be representative of a message either approving or rejecting the establishment of a relationship with the first user. In some embodiments, the client application 253*b* sends the consent response based at least in part on a user input from the second user. In some embodiments, the client application 253*b* sends the consent response to the relationship service 239 in response to receiving the consent request from block 423. In some embodiments, the client application 253*b* can send the consent response to another system, service, or application in the network environment 200.

Next, at block 429, the relationship service 239 can be executed to send a request for an identification document. Similarly to the discussion of block 403, the request for identification documents can be representative of a message requesting the upload or submission of identification documents which can be used to verify the identity of the second user. The relationship service 239 can send a request for identification documents in response to receiving the consent response at block 426. In some embodiments, the relationship service 239 sends the request for identification documents to the client application 253*b* associated with the second user, or to another system, service, or application within the network environment 200.

At block 433, the client application 253*b* can be executed to send an identification document. Similarly to the client application 253*a* in the discussion of block 406, the client application 253*b* can send an identification document in response to receiving the request for identification documents from the relationship service 239 at block 429. The client application 253*b* can send the identification document based at least in part on a user interaction, such as, for example, receiving an uploaded identification document in response to a user interaction. In some examples, the client application 253*b* can send an identification document to the processing service 243, to the relationship service 239, or to another system, service, or application in the network environment 200.

At block 436, the processing service 243 can be executed to extract document data. Similarly to the discussion of block 409, the processing service 243 can be executed to receive the identification document from the client application 253*b* at block 433, and extract document data from the identification document. The processing service 243 can extract the document data using OCR, artificial intelligence techniques such as, for example, machine learning (ML), natural language processing (NLP), intelligent document processing (IDP), or other data extraction techniques. In some embodiments, the processing service 243 can extract document data based at least in part on receiving the identification document from the client application 253*b* at block 433. The processing service 243 can send the extracted document data to the relationship service 239, or to another system, service, or application within the network environment 200.

At block 439, the relationship service 239 can be executed to validate the document data. Similarly to the discussion of block 413, the relationship service 239 can validate the document data received from the processing service 243 at block 436. The relationship service 239 can validate the document data based at least in part on a comparison of the document data with data associated with the second user. In some examples, the relationship service 239 can validate the document data based at least in part on one or more DIDs included in the document data, described in greater detail in the discussion of FIG. 3.

Then, at block 443, the relationship service 239 can be executed to establish a relationship. Similarly to the discussion of block 336 of FIG. 3, the relationship service 239 can establish a relationship between the first user and at least the second user based at least in part on receiving a positive consent response from the client application 253*b* at block 426. The relationship service 239 can establish the relationship based at least in part on the document data validated at block 439. In some examples, the relationship service 239 can establish a relationship between the first user and one or more other users identified in the selection of potential relationships at block 419 and further based at least in part on receiving a positive consent response from each of the users identified. According to various examples, the relationship service 239 can establish a relationship between the first user and the one or more users identified in the selection based at least in part on validating document data from each of the users identified. In some embodiments, the relationship service 239 can save the established relationship to a data store 233. After block 443, the sequence diagram of FIG. 4 comes to an end.

Figure 5:
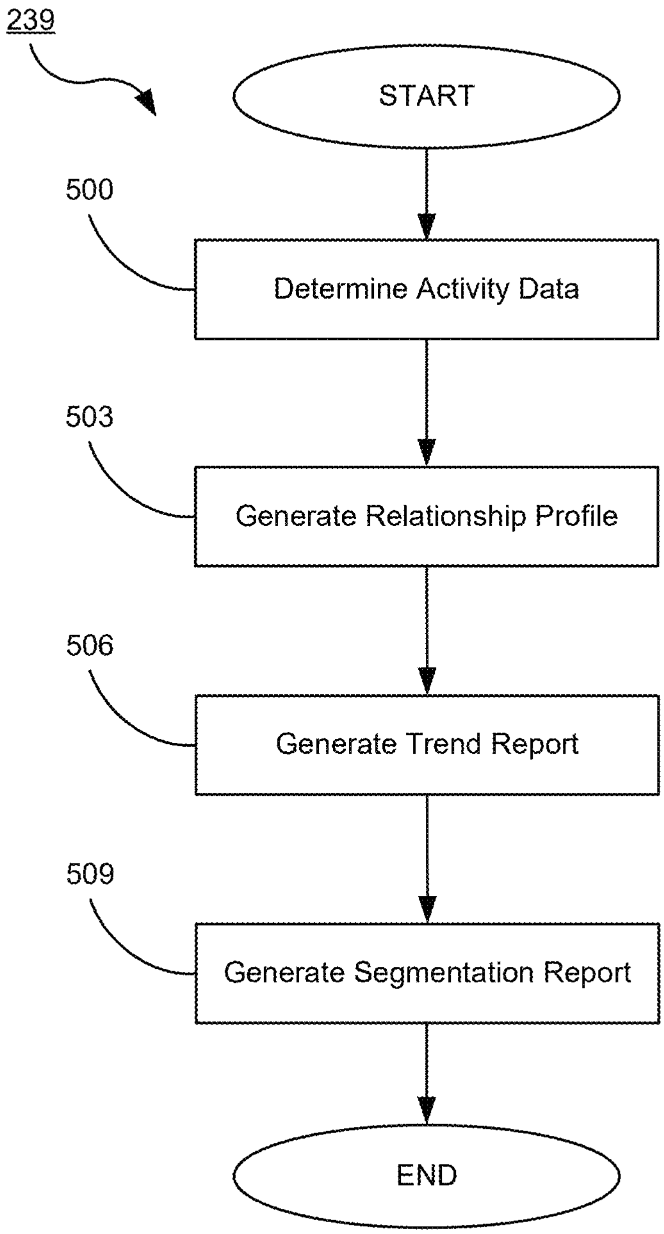
FIG. 5 is a flowchart illustrating one example of functionality implemented as portions of an application executed in a computing environment in the network environment of FIG. 2 according to various embodiments of the present disclosure.

Referring next to FIG. 5, shown is a flowchart that provides one example of the operation of a portion of the relationship service 239. The flowchart of FIG. 5 provides merely an example of the many different types of functional arrangements that can be employed to implement the operation of the depicted portion of the relationship service 239. As an alternative, the flowchart of FIG. 5 can be viewed as depicting an example of elements of a method implemented within the network environment 200.

Beginning with block 500, the relationship service 239 can be executed to determine activity data 246. In some embodiments, the relationship service 239 can determine activity data 246 for each user associated with an established relationship. For example, the relationship service 239 can at least determine first activity data 246*a* associated with a first user and determine second activity data 246*b* associated with a second user. In some embodiments, the relationship service 239 can obtain activity data 246 from a data store 233 or other system, service, or application in the network environment 200.

Next, at block 503, the relationship service 239 can be executed to generate a relationship profile. In some embodiments, the relationship service 239 can generate a relationship profile based at least in part on the activity data 246 determined at block 500. The relationship service 239 can generate a relationship profile based at least in part on combining the activity data 246 for each of the users associated with an established relationship.

At block 506, the relationship service 239 can be executed to generate a trend report. In some examples, the relationship service 239 can generate a trend report based at least in part on the relationship profile generated at block 503. In some examples, the trend report can include predicted activities associated with the relationship profile. The relationship service 239 can generate the trend report based at least in part on the activity data 246 determined at block 500.

Next, at block 509, the relationship service 239 can be executed to generate a segmentation report. In some examples, the relationship service 239 can generate a segmentation report based at least in part on the relationship profile generated at block 503. The segmentation report can include at least a plurality of segments determined based at least in part on the activity data 246 determined at block 500. In some embodiments, the relationship service 239 generates the segmentation report based at least in part on the activity data 246 determined at block 500. After block 509, the flowchart of FIG. 5 comes to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
- a computing device comprising a processor and a memory; and
- machine-readable instructions stored in the memory that, when executed by the processor, cause the computing device to at least:
  - receive a first user decentralized identifier (first user DID) associated with a first user and an issuer decentralized identifier (issuer DID) associated with an issuing authority;
  - identify a blockchain based at least in part on the issuer DID;
  - obtain relationship data from the blockchain based at least in part on the first user DID;
  - determine a second user decentralized identifier (second user DID) associated with a second user based at least in part on the relationship data; and
  - establish a relationship between the first user and the second user.

2. The system of claim 1, wherein the machine-readable instructions, when executed, further cause the computing device to at least:
- receive an identifier associated with the first user; and
- obtain, based at least in part on the identifier, the first user DID and the issuer DID.

3. The system of claim 1, wherein the machine-readable instructions, when executed, further cause the computing device to at least:
- determine first activity data associated with the first user;
- determine second activity data associated with the second user; and
- generate a relationship profile based at least in part on the first activity data and the second activity data.

4. The system of claim 3, wherein the machine-readable instructions, when executed, further cause the computing device to at least generate a trend report based at least in part on the relationship profile, the trend report predicting activities associated with the relationship profile.

5. The system of claim 3, wherein the machine-readable instructions, when executed, further cause the computing device to at least generate a segmentation report based at least in part on the relationship profile, the segmentation report including at least a plurality of segments determined based at least in part on the first activity data and the second activity data.

6. The system of claim 1, wherein the machine-readable instructions, when executed, further cause the computing device to at least:
- send a consent request to a client device associated with the second user;
- receive a consent response from the client device; and
- establish a relationship between the first user and the second user based at least in part on the consent response.

7. The system of claim 1, wherein the machine-readable instructions, when executed, further cause the computing device to at least validate the relationship data.

8. A non-transitory, computer-readable medium comprising machine-readable instructions that, when executed by a processor of a computing device, cause the computing device to at least:
- receive a first user decentralized identifier (first user DID) associated with a first user and an issuer decentralized identifier (issuer DID) associated with an issuing authority;
- identify a blockchain based at least in part on the issuer DID;
- obtain relationship data from the blockchain based at least in part on the first user DID;
- determine a second user decentralized identifier (second user DID) associated with a second user based at least in part on the relationship data; and
- establish a relationship between the first user and the second user.

9. The non-transitory, computer-readable medium of claim 8, wherein the machine-readable instructions, when executed, further cause the computing device to at least:
- receive an identifier associated with the first user; and
- obtain, based at least in part on the identifier, the first user DID and the issuer DID.

10. The non-transitory, computer-readable medium of claim 8, wherein the machine-readable instructions, when executed, further cause the computing device to at least:
- determine first activity data associated with the first user;
- determine second activity data associated with the second user; and
- generate a relationship profile based at least in part on the first activity data and the second activity data.

11. The non-transitory, computer-readable medium of claim 10, wherein the machine-readable instructions, when executed, further cause the computing device to at least generate a trend report based at least in part on the relationship profile, the trend report predicting activities associated with the relationship profile.

12. The non-transitory, computer-readable medium of claim 10, wherein the machine-readable instructions, when executed, further cause the computing device to at least generate a segmentation report based at least in part on the relationship profile, the segmentation report including at least a plurality of segments determined based at least in part on the first activity data and the second activity data.

13. The non-transitory, computer-readable medium of claim 8, wherein the machine-readable instructions, when executed, further cause the computing device to at least:

send a consent request to a client device associated with the second user;

receive a consent response from the client device; and establish a relationship between the first user and the second user based at least in part on the consent response.

14. The non-transitory, computer-readable medium of claim 8, wherein the machine-readable instructions, when executed, further cause the computing device to at least validate the relationship data.

15. A method, comprising:

receiving a first user decentralized identifier (first user DID) associated with a first user and an issuer decentralized identifier (issuer DID) associated with an issuing authority;

identifying a blockchain based at least in part on the issuer DID;

obtaining relationship data from the blockchain based at least in part on the first user DID;

determining a second user decentralized identifier (second user DID) associated with a second user based at least in part on the relationship data; and establishing a relationship between the first user and the second user.

16. The method of claim 15, further comprising:

receiving an identifier associated with the first user; and obtaining, based at least in part on the identifier, the first user DID and the issuer DID.

17. The method of claim 15, further comprising:

determining first activity data associated with the first user;

determining second activity data associated with the second user; and generating a relationship profile based at least in part on the first activity data and the second activity data.

18. The method of claim 17, further comprising generating a trend report based at least in part on the relationship profile, the trend report predicting activities associated with the relationship profile.

19. The method of claim 17, further comprising generating a segmentation report based at least in part on the relationship profile, the segmentation report including at least a plurality of segments determined based at least in part on the first activity data and the second activity data.

20. The method of claim 15, further comprising:

sending a consent request to a client device associated with the second user;

receiving a consent response from the client device; and establishing a relationship between the first user and the second user based at least in part on the consent response.

21. The method of claim 15, further comprising validating the relationship data.

* * * * *